United States Patent Office.

WILLIAM VERMILYA, OF DAYTON, OHIO.

Letters Patent No. 64,602, dated May 7, 1867.

---

IMPROVED COMPOSITION FOR INVIGORATING FRUIT AND FOREST TREES.

---

The Schedule referred to in these Letters Patent and making part of the same.

---

TO WHOM IT MAY CONCERN:

I, WILLIAM VERMILYA, of Dayton, Montgomery county, Ohio, have invented a new and improved Composition for Invigorating Fruit or Forest Trees, and destroying insects in and upon the same; and I hereby declare that the following is a full and exact description thereof.

I make a compound of sulphate of copper, sulphur, saltpetre, and iron filings, which I insert into the body of the tree which is to be invigorated, or in and upon which are vermin, which I do by boring a hole in the body near the root with an auger, from a half-inch to three-quarter auger, in proportion to the size of the tree. In the hole I put from one (1) to two (2) ounces of the compound, and plug up the hole tight with a wooden plug.

The following is a description of the compound: I take in the proportion of three (3) pounds of sulphate of copper, one (1) pound of sulphur, one (1) ounce of saltpetre, all of which I pulverize separately and mix with half a pound of iron filings.

What I claim as my invention, and desire to secure by Letters Patent, is—

The composition of matter formed by the mixture of the proportions of three pounds of sulphate of copper, one pound of sulphur, one ounce of saltpetre, and a half pound of iron filings, to be used as a tree invigorator and destroyer of vermin which may be in and upon fruit or forest trees, as herein described.

WILLIAM VERMILYA.

Witnesses:
JOHN HOWARD,
WILLIAM C. HOWARD.